(12) United States Patent
Passmann

(10) Patent No.: US 12,441,282 B2
(45) Date of Patent: Oct. 14, 2025

(54) SYSTEM AND METHOD FOR CONTROLLING/ADJUSTING THE WHEEL BEHAVIOUR OF AT LEAST ONE VEHICLE WHEEL

(71) Applicant: ZF Active Safety GmbH, Koblenz (DE)

(72) Inventor: Andreas Passmann, Hilgert (DE)

(73) Assignee: ZF Active Safety GmbH, Koblenz (DE)

( * ) Notice: Subject to any disclaimer, the term of this patent is extended or adjusted under 35 U.S.C. 154(b) by 370 days.

(21) Appl. No.: 17/882,912

(22) Filed: Aug. 8, 2022

(65) Prior Publication Data

US 2023/0053237 A1     Feb. 16, 2023

(30) Foreign Application Priority Data

Aug. 11, 2021  (DE) .......................... 102021120954.4

(51) Int. Cl.
 *B60T 8/1761*  (2006.01)
 *B60T 8/171*   (2006.01)

(52) U.S. Cl.
 CPC .......... *B60T 8/17616* (2013.01); *B60T 8/171* (2013.01); *B60T 2210/10* (2013.01); *B60T 2230/02* (2013.01); *B60T 2240/06* (2013.01); *B60T 2250/00* (2013.01); *B60T 2270/10* (2013.01)

(58) Field of Classification Search
 CPC .... B60T 8/17616; B60T 8/171; B60W 10/06; B60W 10/08; B60W 10/18; B60W 30/18172
 See application file for complete search history.

(56) References Cited

U.S. PATENT DOCUMENTS

| | | | |
|---|---|---|---|
| 2016/0264111 A1* | 9/2016 | Doi ......................... | B60T 8/267 |
| 2017/0183008 A1* | 6/2017 | Isono .............. | B60W 30/18172 |
| 2018/0111607 A1* | 4/2018 | Fujita .................... | B60T 8/1755 |
| 2021/0046913 A1* | 2/2021 | Wirthl ................... | B60T 8/1761 |
| 2021/0339749 A1* | 11/2021 | Takaira ................ | B60W 10/119 |

FOREIGN PATENT DOCUMENTS

| | | |
|---|---|---|
| DE | 102005009002 A1 | 8/2006 |
| DE | 102014006191 A1 | 11/2015 |

* cited by examiner

*Primary Examiner* — Luke Huynh
(74) *Attorney, Agent, or Firm* — Kristin L. Murphy

(57) ABSTRACT

A system for a vehicle for controlling/adjusting the wheel behaviour of at least one vehicle wheel comprises at least one unit for determining the wheel vertical force of at least two vehicle wheels which are mounted on the same axle of the vehicle. The system is adapted to determine for each of the at least two vehicle wheels at least one parameter indicative of the wheel behaviour. The system is further adapted to determine, on the basis of the wheel vertical forces determined by the unit for determining the wheel vertical force for the at least two vehicle wheels, at least the vehicle wheel with the higher wheel vertical force. The system is further adapted to set the at least one parameter indicative of the wheel behaviour determined for the at least one vehicle wheel with the higher wheel vertical force as the target value for the vehicle wheel with a lower wheel vertical force.

20 Claims, 4 Drawing Sheets

SYSTEM AND METHOD FOR CONTROLLING/ADJUSTING THE WHEEL BEHAVIOUR OF AT LEAST ONE VEHICLE WHEEL

CROSS-REFERENCE TO RELATED APPLICATION

This application claims priority to German Patent Application No. 102021120954.4, filed Aug. 11, 2021, the disclosure of which is incorporated herein by reference in its entirety.

TECHNICAL FIELD

The present disclosure relates to a system for controlling/adjusting the wheel behaviour of at least one vehicle wheel where the wheel vertical forces of the vehicle wheels are different. The present disclosure relates further to a method for controlling/adjusting the wheel behaviour of at least one vehicle wheel where the wheel vertical forces of the vehicle wheels are different.

BACKGROUND

Antilock braking systems (ABS) for vehicles are known from the prior art. Antilock braking systems prevent vehicle wheels from locking during a braking operation so as to maintain the steerability of the vehicle. Skidding of the vehicle during the braking operation can thereby be avoided. For off-road vehicles, special additional functions for antilock braking systems are further known, which are also referred to as "off-road ABS". In an "off-road ABS", one or more vehicle wheels can intermittently be blocked, in particular on loose ground, in order to maintain the steerability of the vehicle off road.

SUMMARY

What is needed is an arrangement to further improve existing antilock braking systems.

This object is achieved with a system for controlling/adjusting the wheel behaviour of at least one vehicle wheel having the features of claim 1.

Further embodiments are indicated in the dependent claims.

A system for a vehicle for controlling/adjusting the wheel behaviour of at least one vehicle wheel comprises at least one unit for determining the wheel vertical force of at least two vehicle wheels which are mounted on the same axle of the vehicle. The system is adapted to determine for each of the at least two vehicle wheels at least one parameter indicative of the wheel behaviour. The system is adapted to determine, on the basis of the wheel vertical forces determined by the unit for determining the wheel vertical force for the at least two vehicle wheels, at least the vehicle wheel with the higher wheel vertical force. The system is further adapted to set the at least one parameter indicative of the wheel behaviour determined for the vehicle wheel with the higher wheel vertical force as the target value for the vehicle wheel with a lower wheel vertical force.

In one exemplary arrangement, the wheel vertical forces of the vehicle wheels are different, a braking action which can contribute towards decelerating the vehicle can be achieved also with the vehicle wheel or the vehicle wheels with a lower wheel vertical force. The system allows for a state perceived by the driver as underbraking, in which an insufficient braking action is achieved despite sufficient brake operation by the driver and/or the driver assistance system, can thus be avoided. In one exemplary arrangement, in the case of an incline and/or off road, a controlled braking operation can be achieved with the system. This controlled braking operation is performed in accordance with the brake operation by the driver via the brake pedal or in accordance with the brake operation by the driver assistance system, so that underbraking is ruled out.

The system can be adapted to determine, on the basis of the at least one parameter indicative of the wheel behaviour of the vehicle wheel with the higher wheel vertical force, a target wheel torque for the at least one vehicle wheel with the lower wheel vertical force. The system can be adapted to set this target wheel torque as the target value for the at least one vehicle wheel with the lower wheel vertical force.

The system can be adapted to determine a wheel speed of the vehicle wheel with the higher wheel vertical force as at least one parameter indicative of the wheel behaviour. This wheel speed determined by the system for the wheel with the higher wheel vertical force can be set by the system as the target value for the at least one vehicle wheel with the lower wheel vertical force.

The system can be adapted to end the setting of the parameter indicative of the wheel behaviour of the vehicle wheel with the higher wheel vertical force as the target value for the vehicle wheel with the lower wheel vertical force if a change in the wheel behaviour of the vehicle wheel with the higher wheel vertical force and/or of the vehicle wheel with the lower wheel vertical force is determined.

The unit for determining the wheel vertical force can be adapted to determine the wheel vertical force for each vehicle wheel. For this purpose, the unit for determining the wheel vertical force can be connected or able to be connected to at least two spring travel sensors of a damper system of the vehicle. The spring travel sensors can monitor the shock absorbers of the vehicle wheels, for example, in order to determine the spring travel of the shock absorbers. The unit for determining the wheel vertical force can also be connected to four spring travel sensors of the damper system.

The system can further be adapted to determine a state of articulation of the vehicle wheels on the basis of the wheel vertical forces of the vehicle wheels determined by the unit for determining the wheel vertical force. A state of articulation can be present if the vehicle wheels of a vehicle have different wheel vertical forces with respect to the vehicle side and/or the front and rear axle. A state of articulation is present, for example, if the left front vehicle wheel and the right rear vehicle wheel have a high wheel vertical force while the right front vehicle wheel and the left rear vehicle wheel have a lower wheel vertical force. In other words, in a state of articulation, different wheel vertical forces can be present at the vehicle wheels on the wheel diagonal. In a state of articulation, the vehicle wheels can have a different height level, for example owing to uneven ground. The height level of the vehicle wheels can be reflected, for example, in the spring travel of the shock absorber associated with the vehicle wheel. An articulation can be present with respect to the ground, for example, if the left front vehicle wheel and the right rear vehicle wheel are situated on an elevation of the ground, that is to say the damper systems or shock absorbers of these vehicle wheels can be compressed, while the right front vehicle wheel and the left rear vehicle wheel are located in a depression in the ground, that is to say the damper systems or shock absorbers of these vehicle wheels are not compressed or are compressed less than the damper systems of the other two vehicle wheels.

The system can be adapted to set the parameter indicative of the wheel behaviour for the vehicle wheel with the higher wheel vertical force as the target value for the vehicle wheel with the lower wheel vertical force on the same axle. For example, the wheel speed of the vehicle wheel with the higher wheel vertical force on the front axle can be set as the target value for the wheel speed of the vehicle wheel with a lower wheel vertical force on the front axle. The parameters determined for the vehicle wheels with a higher wheel vertical force can thus be "copied" to the wheels on the same axle which have a lower wheel vertical force.

The system can be adapted to determine at least the wheel speed of the at least two vehicle wheels. The system can further be adapted to determine the wheel speed of four or more vehicle wheels. With the determined wheel speed, the wheel speed of each vehicle wheel and also the wheel acceleration of each vehicle wheel can be determined. Furthermore, the wheel slip for each vehicle wheel can also be determined on the basis of the determined wheel speed. The wheel speed can be a parameter indicative of the wheel behaviour and thus can also be set as the target value for the vehicle wheel with the lower wheel vertical force. The same is true of the wheel acceleration.

The system can be adapted to determine an inclination of the vehicle. For this purpose, the system can be connected or able to be connected to an inclination sensor, for example. On the basis of the inclination of the vehicle, the system can determine the gradient of the section on which the vehicle is located. On the basis of the inclination of the vehicle, the system can also determine whether the vehicle is travelling uphill or downhill.

The system can further be adapted to determine the nature of the ground on which the vehicle is moving. The system can, for example, determine whether the vehicle is on loose ground or on solid ground such as a road.

The system can be connected to a braking system or an antilock braking system of a vehicle. The wheel behaviour of the at least one vehicle wheel with the lower wheel vertical force can thereby be adjusted/controlled in accordance with the target value via the brake at the vehicle wheel in question.

A method for controlling/adjusting the wheel behaviour of at least one vehicle is also disclosed.

The method for controlling/adjusting the wheel behaviour of at least one vehicle wheel comprises the following steps:
determining a wheel vertical force of at least two vehicle wheels which are mounted on the same axle of a vehicle,
determining at least one parameter indicative of wheel behaviour for each of the at least two vehicle wheels,
determining at least the vehicle wheel with the higher wheel vertical force on the basis of the determined wheel vertical forces for the at least two vehicle wheels, and
setting the at least one parameter determined for the vehicle wheel with a higher wheel vertical force as a target value for the vehicle wheel with a lower wheel vertical force.

The method can determine a target wheel torque for the at least one vehicle wheel with a lower wheel vertical force on the basis of the at least one parameter indicative of the wheel behaviour for the vehicle wheel with the higher wheel vertical force. The method can set a target wheel torque as the target value for the at least one vehicle wheel with the lower wheel vertical force.

The method can determine a wheel speed of the vehicle wheel with the higher wheel vertical force as at least one parameter indicative of the wheel behaviour for the vehicle wheel. Furthermore, the method can set this wheel speed as the target value for the at least one vehicle wheel with the lower wheel vertical force.

The method can end the setting of the parameter indicative of the wheel behaviour of the vehicle wheel with the higher wheel vertical force as the target value for the vehicle wheel with the lower wheel vertical force if a change in the wheel behaviour is determined on the basis of the wheel behaviour of the vehicle wheel with the higher wheel vertical force or the vehicle wheel with the lower wheel vertical force.

The method can determine a state of articulation of the vehicle wheels on the basis of the wheel vertical forces for the vehicle wheels determined by the unit for determining the wheel vertical force. The method can set the parameter indicative of the wheel behaviour for the vehicle wheel with the higher wheel vertical force as the target value for the vehicle wheel with the lower wheel vertical force on the same axle.

The method can determine a wheel speed at least for each of the at least two vehicle wheels. The method can determine an inclination of the vehicle. The method can determine the nature of the ground on which the vehicle is moving.

BRIEF DESCRIPTION OF DRAWINGS

An exemplary arrangement will be explained in the following text with reference to the accompanying figures, in which.

DETAILED DESCRIPTION

Figure 1:
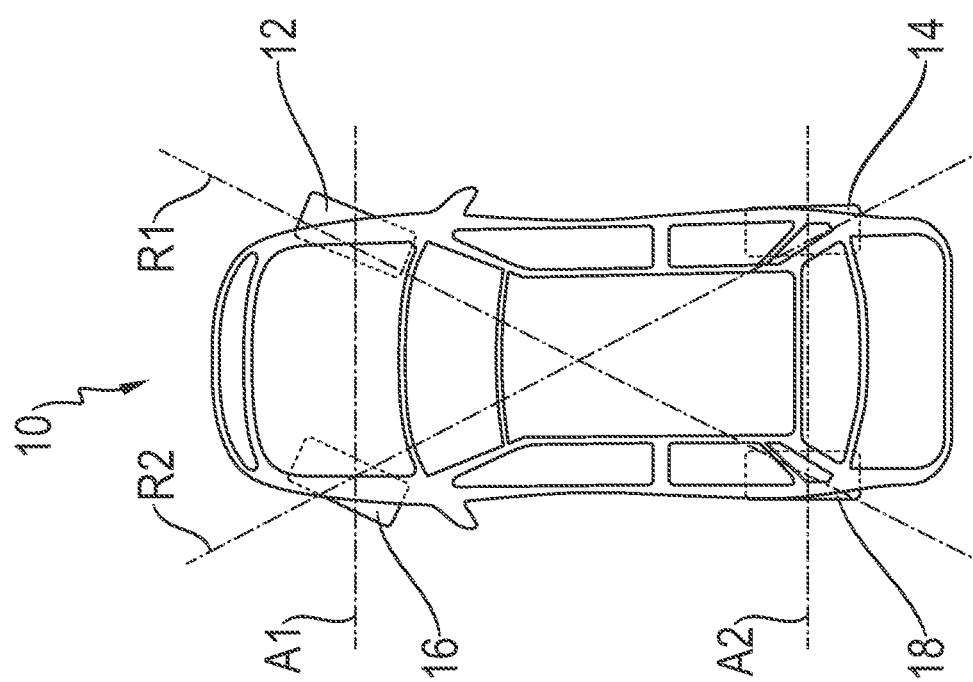
FIGS. 1 and 2 are views for the purpose of explaining a state of articulation of vehicle wheels.

FIG. 1 shows a vehicle 10. The vehicle 10 has four vehicle wheels 12, 14, 16 and 18. A state of articulation can be established with respect to two wheel diagonals R1 and R2. A state of articulation is established when the right front vehicle wheel 12 and the left rear vehicle wheel 18 (wheel diagonal R1) lie approximately at one height level and the left front vehicle wheel 16 and the right rear vehicle wheel 14 (wheel diagonal R2) lie at a different height level. Such a state occurs, for example, when the right front vehicle wheel 12 and the left rear vehicle wheel 18 are located in a depression in the ground compared to the vehicle wheels 14 and 16. An articulation can also occur when the left front vehicle wheel 16 and the right rear vehicle wheel 14 are located on an elevation of the ground. Such a state is shown in FIG. 2.

Figure 2:
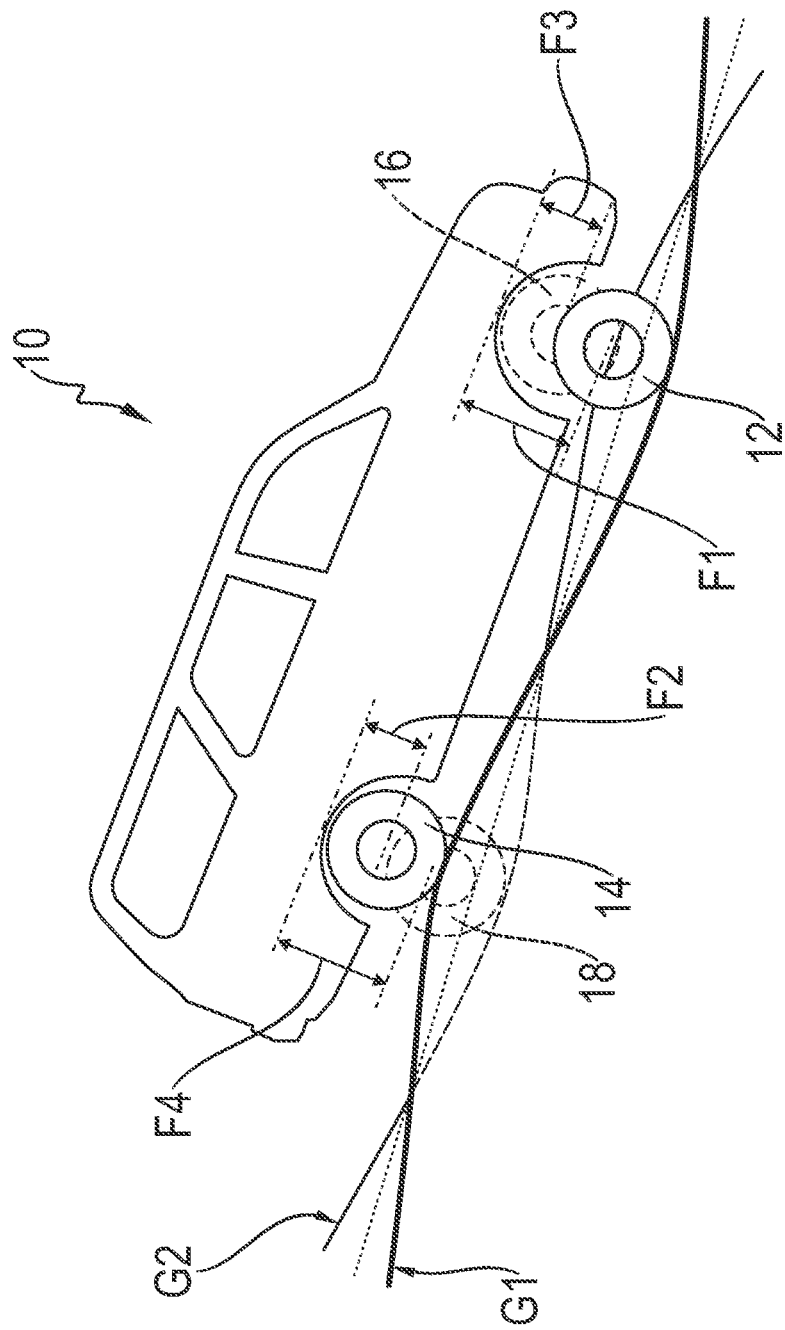

FIG. 2 depicts, schematically, the ground profile G1 for the right vehicle wheels 12 and 14 and the ground profile G2 for the left vehicle wheels 16 and 18. The right front vehicle wheel 12 is in a depression and the right rear vehicle wheel 14 is on an elevation. This is also apparent from the marked spring travels F1, F2 for the damper systems (shown) of the right vehicle wheels 12 and 14. The spring travel F1 of the right front vehicle wheel 12 is relatively large. The spring travel F2 for the right rear vehicle wheel is smaller than the spring travel F1, i.e. the shock absorber of the right rear vehicle wheel 14 is in a compressed state owing to the elevation of the ground.

The shock absorbers of the vehicle wheels 16 and 18 of the left vehicle side are in a different state of compression. The left front vehicle wheel 16 is on an elevation while the left rear vehicle wheel 18 is in a depression. Accordingly, the spring travel F3 of the shock absorber of the left front vehicle wheel 16, similarly to the right rear vehicle wheel 14, is smaller than the spring travel F4 of the shock absorber of the left rear vehicle wheel 18.

The vehicle 10 is travelling downhill on an incline. Owing to the ground profile G1, G2 with elevations and depressions described above, the vehicle wheels 12, 14, 16 and 18 have different wheel vertical forces. This is also apparent from the different spring travels F1, F2, F3 and F4 of the shock absorbers of the vehicle wheels 12, 14, 16 and 18. The right front vehicle wheel 12 and the left rear vehicle wheel 18 have low wheel vertical forces because the vehicle wheels 12 and 18 are in a depression. The left front vehicle wheel 16 and the right rear vehicle wheel 14 have wheel vertical forces which are greater than the wheel vertical forces of the vehicle wheels 12 and 18. The wheel vertical forces of the vehicle wheels 12, 14, 16 and 18 can be determined by means of spring travel sensors on the wheel suspensions or damper systems of the individual vehicle wheels 12, 14, 16 and 18.

Owing to the different wheel vertical forces of the vehicle wheels 12, 14, 16 and 18, only very different target braking torques can be specified for the vehicle wheels 12, 14, 16 and 18. Owing to the downhill travel shown in FIG. 2, high acceleration forces act on the vehicle as a result of the downhill-slope force. In this state it can happen that the brake pressure of the brakes at the vehicle wheels 12 and 18 with the lower wheel vertical force is reduced almost completely in order to prevent the vehicle wheels 12 and 18 from locking. If a transition occurs in this state to an even incline without opposing depressions and elevations, sufficient brake pressure must first be built up at the brakes of the vehicle wheels 12 and 18 again in order that the vehicle wheels 12 and 18 can contribute towards decelerating the vehicle. Owing to the time required to build up the brake pressure, an increase in the speed of the vehicle could even occur during the downhill travel shown in FIG. 2, which the driver perceives as underbraking.

This can be prevented by the system and the method according to the present disclosure in that a parameter indicative of the wheel behaviour is determined for the vehicle wheels 14 and 16 with a high wheel vertical force and this parameter is set as the target value for the vehicle wheels 12 and 18 with the lower wheel vertical force. In the state shown in FIG. 2, it is possible by the system and the method according to the present disclosure to adjust/control in particular the wheel behaviour of the vehicle wheels 12 and 18 with a low wheel vertical force such that underbraking can be prevented and a controlled braking operation can be achieved.

For this purpose, the wheel vertical forces of the vehicle wheels 12, 14, 16 and 18 are determined. On the basis of the determined wheel vertical forces of the vehicle wheels 12, 14, 16 and 18, the system is able to establish whether a state of articulation is present. If the state of articulation shown by way of example in FIG. 2 is present, the vehicle wheels 14 and 16 have higher wheel vertical forces than the vehicle wheels 12 and 18. A parameter indicative of the wheel behaviour of the wheels 14 and 16 in question is determined at least for the vehicle wheels 14 and 16 with a higher wheel vertical force. This parameter indicative of the wheel behaviour of the vehicle wheels 14 and 16 with a higher wheel vertical force can be, for example, the wheel speed of the wheels 14 and 16 with a higher wheel vertical force. The wheel speed of the left front vehicle wheel 16, which is a vehicle wheel with a higher wheel vertical force, is set as the target value for the wheel speed of the right front vehicle wheel 12 with a lower wheel vertical force. The wheel speed of the right rear vehicle wheel 14 with a high wheel vertical force is likewise set as the target value for the wheel speed of the left rear vehicle wheel 18. It can thereby be prevented that the brake pressure present at the brakes of the vehicle wheels 12 and 18 with a lower wheel vertical force is reduced in order to prevent locking of the wheels.

Figure 3:
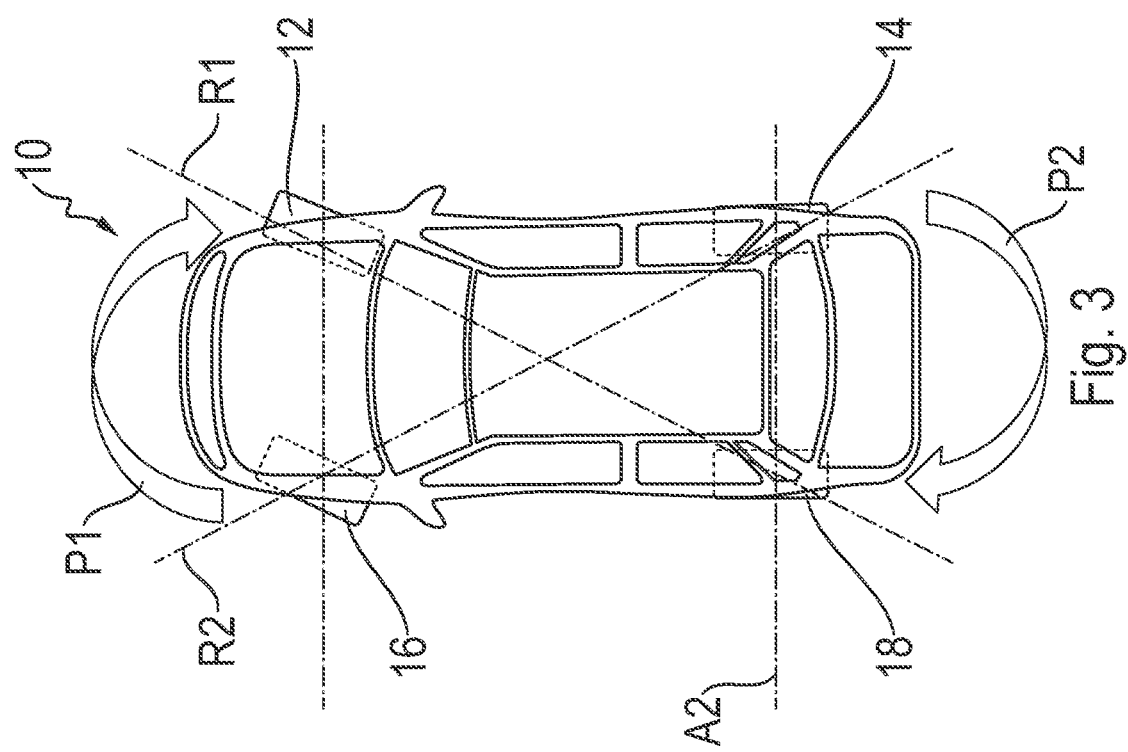
FIG. 3 is a view based on FIG. 1 for the purpose of explaining the functioning of the system and of the method for controlling/adjusting the wheel behaviour of at least one vehicle wheel.

FIG. 3 is a schematic view according to FIG. 1, in which the arrows P1 and P2 have been depicted. The arrows P1 and P2 are intended to illustrate the functioning of the system and of the method according to one exemplary arrangement of the present disclosure. The vehicle wheels with a high wheel vertical force are the right rear vehicle wheel 14 and the left front vehicle wheel 16 (see FIG. 2). A parameter indicative of the wheel behaviour is determined at least for the vehicle wheels 14 and 16. This parameter can be, for example, the wheel speed of the vehicle wheels 14 and 16. The wheel speed of the vehicle wheel 16 on the front axle A1 is set, as is shown by the arrow P1, as the target value for the wheel speed of the vehicle wheel 12, which is likewise located on the front axle A1. The wheel speed of the vehicle wheel 14 on the rear axle A2 is set according to arrow P2 as the target value for the wheel speed of the vehicle wheel 18 on the rear axle A2. The wheel speed or the determined parameter of the wheels 14 and 16 with a high wheel vertical force is set as the target value for the vehicle wheels 12 and 18 with a lower wheel vertical force that are located on the same axle A1, A2 as the vehicle wheels 14 and 16. The system according to one exemplary arrangement of the present disclosure can be connected to a braking system and/or antilock braking system in order to adjust/control the wheel behaviour of the vehicle wheels 12 and 18 with a lower wheel vertical force according to the set target value via the brakes at the vehicle wheels 12 and 18. The system according to the present disclosure can further be part of an antilock braking system.

If it is determined by the system that one of the vehicle wheels 12, 18 with a lower wheel vertical force has a lower wheel slip than the respective wheel 14, 16 with a higher wheel vertical force on the same axle A1, A2, the setting of the parameter indicative of the wheel behaviour of the vehicle wheels 14, 16 with a higher wheel vertical force as the target value for the vehicle wheels 12, 18 with a lower wheel vertical force is ended. This can be the case, for example, when the state of articulation of the vehicle wheels 12, 14, 16 and 18 is no longer present and/or the ground beneath one of the vehicle wheels 12, 18 with a lower wheel vertical force has a higher coefficient of friction than the ground beneath the wheel 14, 16 with a higher wheel vertical force.

Figure 4:
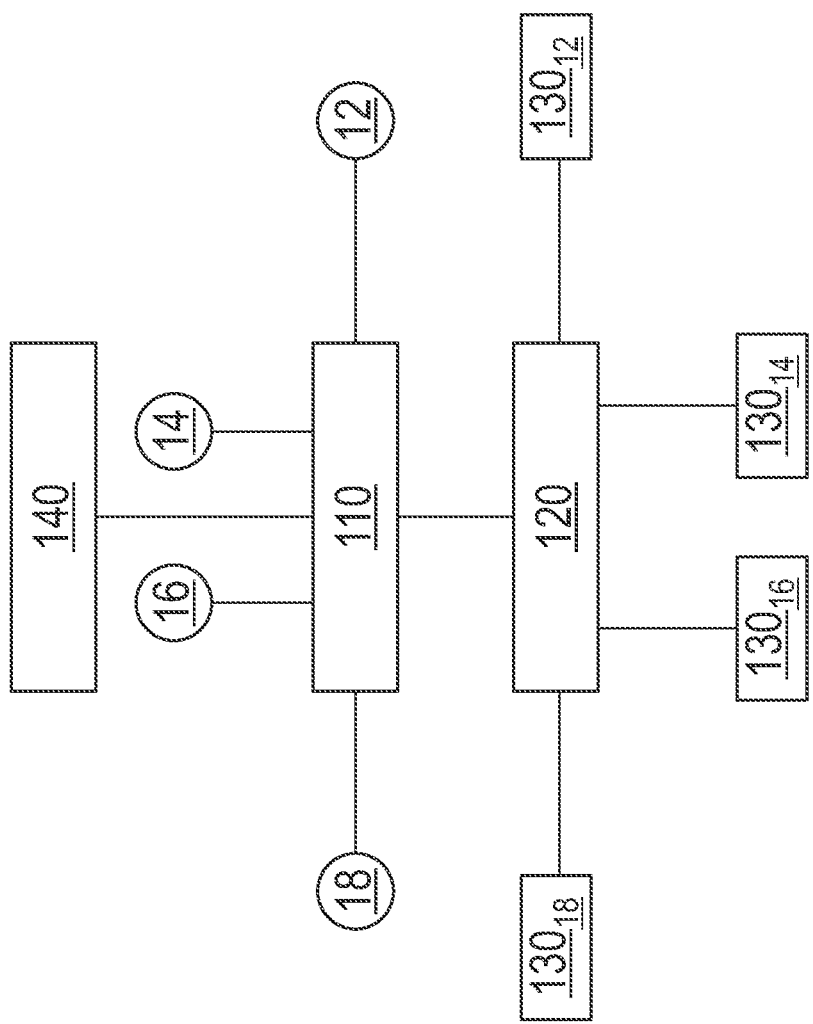
FIG. 4 is a schematic view of the system for controlling/adjusting the wheel behaviour of at least one vehicle wheel.

FIG. 4 shows, schematically, a system 110, a unit 120 for determining the wheel vertical forces, and a braking system/antilock braking system 140. The system 110, the unit 120 and the braking system/antilock braking system 140 can be included in a vehicle (not shown). The system 110 is adapted to determine a parameter indicative of the wheel behaviour of the vehicle wheels 12, 14, 16 and 18. The system 110 can determine the parameter indicative of the wheel behaviour for each vehicle wheel 12, 14, 16, 18 on the basis of the wheel speed of the respective wheel 12, 14, 16 and 18, for example. For this purpose, the system 110 can be connected to wheel speed sensors at the wheels 12, 14, 16, 18. The system 110 is connected to the unit 120 for determining the wheel vertical forces. The unit 120 can be connected to spring travel sensors 130 at the wheel suspensions or the shock absorbers of the vehicle wheels 12, 14, 16, 18. The wheel vertical forces for each wheel 12, 14, 16, 18 can be determined via the spring travels of the wheel suspensions or of the shock absorbers of the vehicle wheels 12, 14, 16, 18 acquired by the spring travel sensors 130. For the system and the method according to the present disclosure, it can be sufficient to establish, on the basis of the determined spring travels, that a higher wheel vertical force is present at the vehicle wheels 14 and 16 than at the vehicle wheels 12 and 18 (see FIG. 2). A quantified determination of the wheel vertical forces is not necessarily required for the method or the system of the present disclosure.

The system 110 can be connected to a braking system/antilock braking system 140 in order to be able to adjust/control the wheel behaviour of the vehicle wheels 12 and 18 with the lower wheel vertical force via the brakes of the vehicle wheels 12 and 18 in accordance with the determined target value. The system 110 can be part of a braking system or antilock braking system 140 of a vehicle.

With the system and the method according to the present disclosure it is possible, with different wheel vertical forces of the vehicle wheels, to achieve a braking action which can contribute towards decelerating the vehicle also with the vehicle wheel or the vehicle wheels with a lower wheel vertical force.

The invention claimed is:

1. A system for a vehicle for controlling/adjusting the wheel behaviour of at least one vehicle wheel, comprising:
   at least one unit configured to determine a wheel vertical force of at least two vehicle wheels which are mounted on the same axle of the vehicle,
   wherein the at least one unit further comprises travel sensors associated with the at least two vehicle wheels, the travel sensors of the at least one unit detecting the wheel vertical force of the at least two vehicle wheels;
   wherein the system is adapted to determine for each of the at least two vehicle wheels—at least one parameter indicative of the wheel behaviour based on the wheel vertical force detected by the travel sensors,
   wherein the system is adapted to determine, on the basis of the wheel vertical forces determined by the unit for determining the wheel vertical force for the at least two vehicle wheels, at least the vehicle wheel with a higher wheel vertical force,
   wherein the system is further adapted to set the at least one parameter indicative of the wheel behaviour determined for the at least one vehicle wheel with the higher wheel vertical force as a target value for the at least one vehicle wheel with a lower wheel vertical force;
   wherein the system is connected or is able to be connected to a braking system and/or an antilock braking system of a vehicle in order to adjust/control the wheel behaviour of the at least one vehicle wheel with the lower wheel vertical force in accordance with the target value via the brake at the vehicle wheel in question.

2. The system according to claim 1, wherein the system is adapted to determine a target wheel torque based on the at least one parameter indicative of the wheel behaviour of the vehicle wheel with the higher wheel vertical force, and to set this target wheel torque as a target value for the at least one vehicle wheel with the lower wheel vertical force.

3. The system according to claim 1, wherein the system further comprises wheel speed sensors that are adapted to determine a wheel speed of the vehicle wheel with the higher wheel vertical force as at least one parameter indicative of the wheel behaviour, and to set this wheel speed as the target value for the at least one vehicle wheel with the lower wheel vertical force.

4. The system according to claim 1, wherein the system is adapted to end a setting of the parameter indicative of the wheel behaviour of the vehicle wheel with a higher wheel vertical force as the target value for the vehicle wheel with a lower wheel vertical force if a change of the vehicle wheel with a higher wheel vertical force and/or of the vehicle wheel with the lower wheel vertical force is determined.

5. The system according to claim 1, wherein the unit for determining the wheel vertical force is configured to determine the wheel vertical force for all the vehicle wheels.

6. The system according to claim 5, wherein the system is adapted to recognize a state of articulation of the vehicle wheels on the basis of the wheel vertical forces for the vehicle wheels determined by the unit for determining the wheel vertical force.

7. The system according to claim 1, wherein the system is adapted to set the parameter indicative of the wheel behaviour for the vehicle wheel with the higher wheel vertical force as the target value for the vehicle wheel with the lower wheel vertical force on the same axle.

8. The system according to claim 1, wherein the unit for determining the wheel vertical forces is connected or is able to be connected to at least two of the travel sensors of a damper system of the vehicle.

9. The system according to claim 1, wherein the system is adapted to determine at least the wheel speed for each of the at least two vehicle wheels.

10. The system according to claim 1, wherein the system is adapted to determine an inclination of the vehicle.

11. The system according to claim 1, wherein the system is adapted to determine the nature of the ground on which the vehicle is moving.

12. A method for controlling/adjusting a wheel behaviour of at least one vehicle wheel, wherein the method comprises the following steps:
    determining a wheel vertical force of at least two vehicle wheels which are mounted on a common axle of a vehicle using signals from travel sensors associated with at least two vehicle wheels,
    determining at least one parameter indicative of the wheel behaviour for each of the at least two vehicle wheels based on the wheel vertical force determined,
    determining at least the vehicle wheel with a higher wheel vertical force based on the determined wheel vertical forces for the at least two vehicle wheels, and
    setting the at least one parameter determined for the at least one vehicle wheel—with the higher wheel vertical force as a target value for the at least one vehicle wheel with the lower wheel vertical force,
    wherein the system is connected or is able to be connected to a braking system and/or antilock braking system of a vehicle in order to be able to adjust/control the wheel behavior of the at least one vehicle wheel with the lower wheel vertical force in accordance with the target value via the brake at the vehicle wheel in question.

13. The method according to claim 12, wherein the method comprises the further steps:
    determining a target wheel torque for the at least one vehicle wheel with a lower wheel vertical force on the basis of the at least one parameter indicative of the wheel behaviour for the vehicle wheel with the higher wheel vertical force, and setting this target wheel torque as the target value for the at least one vehicle wheel with the lower wheel vertical force.

14. The method according to claim 12, wherein the method comprises the further steps of:

determining a wheel speed of the vehicle wheel with the higher wheel vertical force as at least one parameter indicative of the wheel behaviour for the vehicle wheel with the lower wheel vertical force, and setting this wheel speed as the target value for the at least one vehicle wheel with the lower wheel vertical force.

15. The method according to claim 12, wherein the method comprises the further step of:

ending the setting of the parameter indicative of the wheel behaviour of the vehicle wheel with a higher wheel vertical force as the target value for the vehicle wheel with the lower wheel vertical force if a change of the vehicle wheel with a higher wheel vertical force and/or of the vehicle wheel with the lower wheel vertical force is determined.

16. The method according to claim 12, wherein the method comprises the further step of:

determining a state of articulation of the vehicle wheels on the basis of the wheel vertical forces for the vehicle wheels determined by the unit for determining the wheel vertical force.

17. The method according to claim 12, wherein the method comprises the further step of:

setting the parameter indicative of the wheel behaviour of the vehicle wheel—with the higher wheel vertical force as the target value for the vehicle wheel with the lower wheel vertical force on the same axle.

18. The method according to claim 12, wherein the system comprises the further step of:

determining the wheel speed at least for each of the at least two vehicle wheels.

19. The method according to claim 12, wherein the method comprises the further step of:

determining an inclination of the vehicle.

20. The method according to claim 12, wherein the method comprises the further step of:

determining the nature of the ground on which the vehicle is moving.

* * * * *